March 30, 1948.  J. T. RUNYAN  2,438,578
BUMPER
Filed May 16, 1947

INVENTOR.
JEFFERSON T. RUNYAN
BY Harold W Mattingly
Attorney

Patented Mar. 30, 1948

2,438,578

UNITED STATES PATENT OFFICE 2,438,578

BUMPER

Jefferson T. Runyan, Downey, Calif.

Application May 16, 1947, Serial No. 748,554

2 Claims. (Cl. 293—55)

My invention relates to bumpers for automotive vehicles and has particular reference to a bumper construction for commercial vehicles.

Bumpers for commercial vehicles have heretofore generally been of the type used on passenger vehicles but of heavy duty construction. Some commercial vehicle bumpers have been locally made, however, from different structural stock materials and in this respect have not resembled passenger car bumpers. These commercial vehicle bumpers have been designed primarily for protecting the truck or other vehicle from damage either by striking stationary objects or from being struck by moving vehicles.

I have discovered, however, that a very effective bumper may be built that is adapted for other uses also, specifically bumpers made in accordance with my invention may be used as a step for access to a vehicle, may serve as a mount for a trailer hitch and may serve as a securing bar for tie-down purposes for loose loads. In addition to serving effectively for these multiple purposes, my bumpers are adapted to be conveniently located so as to permit free operation of the vehicle, including the accommodation of the tail gate functions of dump trucks and other open body trucks.

It is, therefore, a general object of my invention to provide a multiple purpose bumper for commercial vehicles.

Another object of my invention is to provide a rugged and inexpensive bumper adapted to be used also as a step, tie-down, or trailer hitch.

Still another object of my invention is to provide a multiple purpose vehicle bumper that may be so constructed as to be located on the vehicle without interference with the operation of the vehicle.

A further object of my invention is to provide a multiple purpose bumper that may be simply constructed from common stock materials merely by burning out shapes and lengths and welding them together.

Other objects and advantages of my invention will be apparent from the following description and claims considered together with the accompanying drawings, in which:

Figure 1:
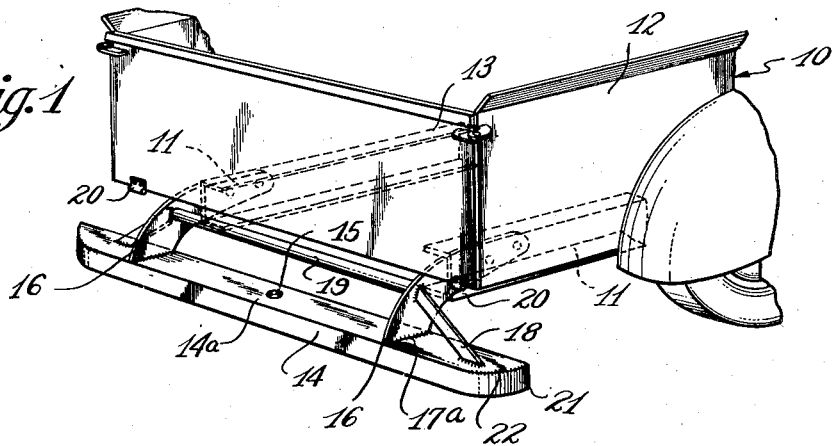
Fig. 1 is a perspective view of a presently preferred bumper construction as applied to an open body truck having a tail gate.

Referring to the drawings, a truck 10 may have two lengthwise frame members 11 which for purposes of illustration are indicated as channel members. A truck body 12 may be secured to these frame members 11 and the body may include a tail gate 13 hinged to the body 12 in any suitable manner, as at 20.

Figure 2:
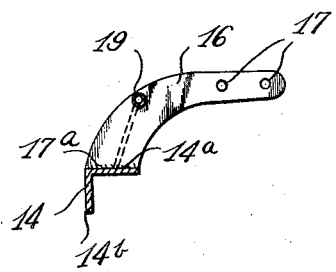
Fig. 2 is a sectional view along the line II—II of Fig. 1.

The bumper of Figs. 1 and 2 may include a horizontal angle iron member 14 disposed generally transverse to the truck 10 and may be secured to the truck 10 by means of two support plates 16 welded or otherwise secured to the top portion of the angle member 14. As clearly illustrated the support plates 16 may have the outline of a downwardly curved horn and may have apertures 17 in the small end thereof through which bolts may be passed to secure this small end to the lengthwise channels 11 of the truck 10.

The angle 14 may be secured against rotation with respect to the support plates 16 by means of a weld 17a, securing these two members together. Accordingly, the weld 17a may be for the entire width of one surface of the angle 14 so as to obtain maximum structural support. The angle member 14 may be prevented from movement due to lengthwise blows by means of inclined braces 18 which may be welded at one end to the outer ends of the angle member 14 and at the other end to support plates 16. A tubular brace 19 may extend between the two support plates 16 and may also be welded.

Although the ends of the angle member 14 may be cut off squarely, I have found that a safer bumper structure results when a generally V-shaped portion is cut out of the horizontal plate of the angle member 14 and the vertical plate bent therearound to define a generally curved end 21. A weld 22 may secure this joint together.

As illustrated in Figures 1 and 2, the angle member 14 is positioned so as to have a vertical web and to have a horizontal plate attached at the upper surface of the vertical web. Accordingly, the upper surface 14a of the angle member may serve as a step surface facilitating entry into the truck body 12 or facilitating removal of packages or other freight therefrom. The vertical web of the angle member serves to support the horizontal portion 14a from sagging under heavy loads.

I provide for the convenient attachment of trailer hitches to the bumper construction of my invention by aperturing the horizontal web 14a, for example as at 15, so that bolts may be passed through to secure the trailer hitch. This is in contrast to the usual trailer hitch connection to bumpers wherein an auxiliary angle member must be secured to a generally vertical bumper member so as to provide the necessary horizontal surface. Additionally, the bumper construction is well adapted to receive the loads imposed by carrying a trailer and in this connection the wide effect of the web 14a will resist deformation particularly if supported vertically by the other plate 14b of the angle member 14.

Not only does the tubular brace 19 assist in strengthening the entire structure but also serves as a convenient tie-down bar for loose loads. Accordingly, ropes or other fasteners may be passed around the load and over the tail gate 13 so as to be tied to the tube 19, the rounded surface of which prevents cutting or chafing of the ropes. Additionally, tie-down ropes may be passed under the braces 18. The use of the tube 19 as a tie-down device does not interfere with the effectiveness of the plate 14a as a step inasmuch as the tube is disposed above and inwardly from the step.

It will be noted that the particular type of support plate 16 illustrated in Figs. 1 and 2 disposes the bumper structure as a whole out of the path of the swinging tail gate 13, thus permitting the truck body to be used effectively in its intended manner while at the same time adequately protecting the truck from endwise encounters. Accordingly, the angle member 14 may extend slightly outwardly from the tail gate 13 but sufficiently below it to permit the tail gate to be swung past the horizontal position.

The advantage of using an angle member disposed with one web horizontal and the other vertical is obvious, the wide web 14a resisting the blows that are generally delivered along a horizontal direction against the vertical web while the vertical web 14B prevents the horizontal plate from being deformed under the impact of the blows.

Figure 3:
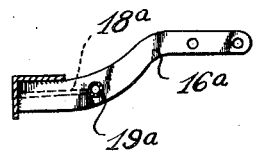
Fig. 3 is a sectional view through a modified form of my invention illustrating a different angular disposition of the supporting bars.

Illustrated in Fig. 3 is a modified form of support plate 16a having an offset shape which is adapted for use on vehicles that do not have tail gates. Accordingly, the bumper structure may be positioned closer in line with the longitudinal frame members of the truck and, if desired, tubular support members 19a and inclined braces 18a may be utilized.

Figure 4:
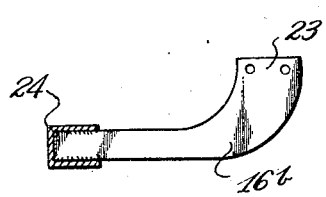
Fig. 4 is a sectional view through a second modified form of my invention illustrating another type of support.

Another form of bumper construction is illustrated in Fig. 4 wherein the body portions of the truck adjacent the end thereof project downwardly so that the bumper structure must be offset. Accordingly, a brace member 16b may have the end attached to the trucks greatly widened, as at 23, so as to provide the maximum resistance to the horizontal impacts received by channel 24, which impacts would have considerable leverage due to the distance of the channel below the point of attachment of the support plate 16b.

Use of the channel 24 gives greater resistance to horizontal blows received by the bumper and is also illustrative of the versatility of my invention, permitting the use of various commercially available steel shapes.

It will be obvious from an inspection of the drawings that bumpers made in accordance with my invention may be readily constructed of commercially available materials. Accordingly, stock angle bars of steel may be employed for the member 14 and may be cut to length by the usual welding torch and may be properly slit so as to provide for the rounded or tapered end 23.

Likewise the braces 18 may be cut by a welding torch from ordinary bar stock and the tubular brace 19 may be cut from ordinary steel tubing. Support plates 16 may be cut with a torch or by a heavy duty punch press from plate material, such as ¼" steel plate. The strongest fabrication is assured by making all connecting joints welded, as illustrated in the drawings, thereby making each connection as strong as the material itself when good quality welding is utilized. While I prefer to utilize welding, it is obvious that other types of fasteners could be employed such as bolts and nuts, screws, etc.

Although I have illustrated my invention with respect to specific embodiments thereof, it is obvious that various modifications could be made therein without departing from the true spirit and scope of my invention. Accordingly, the disclosure is merely illustrative and not limiting.

I claim:

1. A rear bumper construction for use on automotive trucks of the type having a pair of rearwardly extending laterally spaced frame members comprising: a bumper bar formed with a vertical web and a horizontal web; and means for securing said bumper bar to the frame members comprising a pair of spaced support plates extending in vertical planes transverse to the length of said bumper bar, each of said plates having a horizontally extending portion for attachment to a frame member and a downwardly extending portion terminating at said bumper bar and rigidly secured to the upper surface of the horizontal web thereof to dispose the bar rearwardly of the frame members and below the level of the frame members.

2. A rear bumper construction for use on automotive trucks of the type having a pair of rearwardly extending laterally spaced frame members comprising: a bumper bar formed with a vertical web and a horizontal web; means for securing said bumper bar to the frame members comprising a pair of spaced support plates extending in vertical planes transverse to the length of said bumper bar, each of said plates having a horizontally extending portion for attachment to a frame member and a downwardly extending portion terminating at said bumper bar and rigidly secured to the upper surface of the horizontal web thereof to dispose the bar rearwardly of the frame members and below the level of the frame members; a horizontal brace extending between and secured to said support plates at points above the level of said horizontal web; and diagonal braces secured to said bumper bar and said plates and extending inwardly and upwardly from points near the ends of said bumper bar to points on said plates above the level of said horizontal web.

JEFFERSON T. RUNYAN.

REFERENCES CITED

The following references are of record in the file of this patent:

UNITED STATES PATENTS

| Number | Name | Date |
| --- | --- | --- |
| 1,530,484 | Dunston | May 24, 1925 |
| 1,544,163 | Lier | June 30, 1925 |
| 1,546,947 | Sohl | July 21, 1925 |
| 1,554,954 | Coote | Sept. 22, 1925 |
| 1,556,309 | Brocksmith | Oct. 6, 1925 |
| 1,579,621 | Kleven | Apr. 6, 1926 |
| 1,654,687 | Jones | Jan. 3, 1928 |
| 1,905,590 | Isrig | Apr. 25, 1933 |